(12) United States Patent
Vargo et al.

(10) Patent No.: US 6,477,164 B1
(45) Date of Patent: Nov. 5, 2002

(54) SYSTEM AND METHOD FOR REAL-TIME DATA AND VOICE TRANSMISSION OVER AN INTERNET NETWORK

(75) Inventors: Michael F. Vargo, San Carlos, CA (US); Maxim Ladonnikov, Sunnyvale, CA (US)

(73) Assignee: Clarent Corporation, Redwood City, CA (US)

( * ) Notice: Subject to any disclaimer, the term of this patent is extended or adjusted under 35 U.S.C. 154(b) by 0 days.

(21) Appl. No.: 09/130,896

(22) Filed: Aug. 7, 1998

Related U.S. Application Data
(60) Provisional application No. 60/079,659, filed on Mar. 27, 1998.

(51) Int. Cl.[7] .......................... H04L 12/66; H04L 12/28; H04J 3/24
(52) U.S. Cl. ....................... 370/356; 370/474; 370/401; 370/389
(58) Field of Search ................................. 370/352, 353, 370/354, 355, 356, 473, 474, 475, 476, 477, 401, 402, 400, 389, 428, 429, 471, 393

(56) References Cited

U.S. PATENT DOCUMENTS

| | | | | |
|---|---|---|---|---|
| 5,748,613 A | * | 5/1998 | Kilk et al. | 370/473 |
| 5,774,469 A | * | 6/1998 | Wirkestrand | 370/473 |
| 5,930,265 A | * | 7/1999 | Duault et al. | 370/473 |
| 6,304,550 B1 | * | 10/2001 | Fox | 370/393 |

* cited by examiner

*Primary Examiner*—Huy D. Vu
*Assistant Examiner*—Steven Nguyen
(74) *Attorney, Agent, or Firm*—Carr & Ferrell LLP

(57) ABSTRACT

A system and method is disclosed for real-time data and voice transmission over an internet network. A PSTN voice packet is received and digitized at a network gateway. A destination gateway and destination transmux is identified and a destination gateway address and a destination transmux address are appended to the digitized voice packet. The voice packet is received at an originating transmux and broken into gateway subpackets. The gateway subpackets are aggregated and the destination transmux address is removed from the gateway subpackets. The transmux voice packets are then transmitted over the network to a destination transmux, where they are broken into transmux subpackets. The subpackets are sorted and aggregated by a destination gateway address, and the destination gateway addresses are then removed. Voice packets are received from the destination transmux by a destination gateway and converted to analog voice packets and transmitted to a destination PSTN.

18 Claims, 7 Drawing Sheets

SYSTEM AND METHOD FOR REAL-TIME DATA AND VOICE TRANSMISSION OVER AN INTERNET NETWORK

CROSS-REFERENCE TO RELATED APPLICATION

This application claims the benefit of U.S. Provisional application No. 60/079,659, entitled "System and Method for Real-Time Data and Voice Transmission Over an Internet Network," filed on Mar. 27, 1998.

BACKGROUND OF THE INVENTION

1. Field of the Invention

The present invention relates generally to systems and methods for voice and data communication, and more particularly to real-time data and voice transmission over an internet network.

2. Discussion of Background Art

The internet is becoming an ever more integrated part of our industrial, commercial and domestic economy. As a result, there is a continuing push for any technology which expands the internet's performance envelope. In the past, most of the data transmitted over the internet consisted of text files of varying size. Routers, which route data over the internet, were thus designed to transmit large amounts of data, such as text files, in as short of an amount of time as possible (these are called "burst-mode" transmissions). While burst-mode transmissions may be the most efficient method for transmitting such files, such transmissions are not as efficient for transmitting other types of data, such as voice data.

Today, there is an increasing demand for systems and methods for transmitting voice data over the internet. Current Voice Over the Internet (VOI) systems receive real-time voice conversations from Public Switched Telephone Networks (PSTNs). These conversations are then sampled, packetized, and transmitted as voice data over the internet. Voice Over the Internet Protocols (VOIPs) standardize the method for sampling, packetizing and transmitting these conversations.

In contrast to text files, voice data is currently transmitted over the internet as a continuous stream of small data packets. A problem with current VOI systems, however, is that they either tend not to be very clear or they tend to suffer from latency problems. A latency problem is when there is a noticeable delay between when a word is spoken by a first user and when that same word is heard by a second user. VOI systems are particularly sensitive to the latency problems caused by packet transmission delays since users are accustomed to holding voice conversations in real-time, and any added delay tends to break up a conversation.

In an attempt to reduce latency, a voice conversation may be broken up into a large number of relatively small packets that are continuously sent over the internet. Each one of these packets, however, carries a set of overhead bytes for routing the packet to a particular gateway and a particular PSTN. This overhead is fixed, regardless of the packet size, creating a "fixed-cost" problem. Thus, as the packet size is reduced further in an attempt to decrease latency, the overhead bytes become an increasing percentage of the data packet sent. Such a high percentage of overhead noticeably contributes to congestion over the internet and thus increases the voice conversation's latency.

To reduce the percentage of overhead associated with a packet, an alternative is to encode a voice conversation into larger packets of voice data. Utilizing larger packets does reduce the percentage of overhead associated with a fixed amount of voice data; however, the latency of the packet is increased since the packet is not sent until the larger amount of voice data is accumulated. Such an approach tends to result in discontinuous and choppy sounding conversations.

Thus, currently there is a tension between sending smaller sized packets having a greater percentage of overhead and creating high levels of internet traffic, and sending larger packets which tend to chop up the conversations.

Regardless of the encoding method used, as VOI conversations become more and more popular due to their relatively low cost, the number of digital voice packets will exponentially increase. Current VOI systems such as those using "TrueSpeech 8.5," manufactured by DSP Group, Inc. of Santa Clara, Calif. breaks conversations into 30 msec packets that are delivered over the internet at a 12.5 kbps rate (including transmission overhead) with 170 msecs of latency. One-hundred and twenty ports of VOI at a 30 msec frame rate will deliver approximately 4000 Packets Per Second (PPS) over the internet. In the future, G.723.1 compliant VOI systems will deliver 30 msec packets at a 10.5 kbps rate with 100 msec latency, and G.729A compliant VOI systems will deliver 20 msec packets at a 12 kbps rate with 90 msec of latency. Those same one-hundred and twenty ports of VOI at a 20 msec frames will deliver over 6,000 PPS over the internet. Thus as VOI grows, eventually millions of packets will be transmitted over the internet, severely taxing the internet's data throughput capacity.

Adding to VOI's current difficulties, existing routers tend to send packets over the internet using many different routes of indeterminate length. This indeterminacy degrades VOI systems since there is not a predictable packet arrival time or order.

The price for the several shortcomings just discussed is a higher packet drop rate and an excessive packet routing delay.

In response to the concerns discussed above, what is needed is an apparatus and method for real-time data and voice transmission over the internet that overcomes the problems of the prior art.

SUMMARY OF THE INVENTION

The present invention is a system and method for real-time data and voice transmission over an internet network. The transmission begins at an originating phone where an analog signal is conventionally communicated to a public system telephone network (PSTN). Analog packets are then generated and transmitted to a gateway where the analog PSTN voice packets are digitized. A destination gateway and destination transmux are then identified and communicated to the gateway over a separate TCP/IP link. The destination gateway address and destination transmux address are appended to the voice packet in the gateway, and the packets are then aggregated and transmitted to an originating transmux. Gateway voice packets are received from the gateway in the transmux and broken into gateway subpackets. The gateway subpackets are aggregated by their destination transmux address. The destination transmux addresses are then removed from the gateway subpackets and the transmux voice packet is then transmitted across an internet network to a destination transmux. Within the destination transmux, the transmux voice packets are received and broken into transmux subpackets. These transmux subpackets are sorted and aggregated by their destination gateway addresses. Unneeded destination gateway addresses are then removed and the destination voice packets are then transmitted to a destination gateway. Within the destination gateway, the destination voice packets are received and converted to analog voice packets and transmitted to a destination PSTN. Once at the destination PSTN, the voice packets are then converted for transmission to a destination phone.

DETAILED DESCRIPTION OF THE PREFERRED EMBODIMENT

Figure 1:
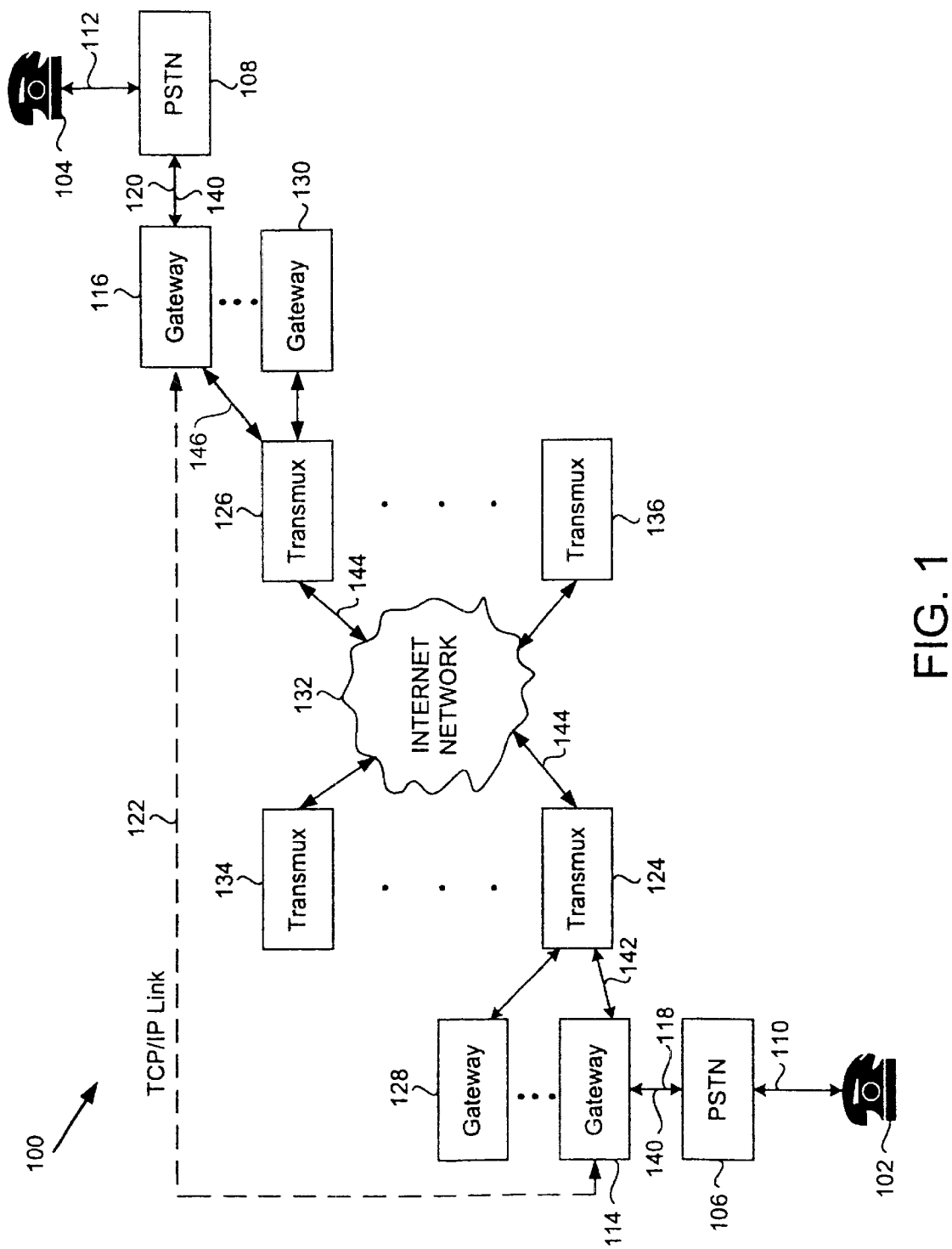
FIG. 1 is a block diagram of a system for real-time data and voice transmission over the internet.

FIG. 1 is a block diagram of a system 100 for real-time data and voice transmission over the internet. Originating phone 102 and destination phone 104 are connected to an originating Public Switched Telephone Network (PSTN) 106 and destination PSTN 108 by single voice lines 110 and 112 respectively. The phones 102, 104 transmit and receive normal voice conversations to and from the PSTNs 106, 108. Those skilled in the art will recognize that the voice conversations may be replaced with facsimile or other data. Also, each originating and destination device discussed herein may alternatively be thought of as an originating node and a destination node on a network.

The discussion which follows describes the invention with respect to a case where a voice conversation is being transmitted from originating phone 102 to destination phone 104 via a particular set of originating and destination gateways 114, 116 and transmuxes 124, 126. Those skilled in the art, however, will recognize that this discussion applies equally well regardless of which phone, PSTN, gateway, and transmux originated or received the call.

The PSTNs 106, 108 can typically interface with up to hundreds of phones (not shown). The PSTNs 106 and 108 transmit voice data to an originating gateway 114 and a destination gateway 116 via a plurality separate voice lines 118 and 120 respectively. Preferably, each PSTN 106, 108 interfaces with only one gateway 114, 116.

Each gateway 114 and 116 is connected to an originating transmission multiplexer (transmux) 124 and destination transmux 126 respectively. The transmuxes 124 and 126 can also be coupled to any number of additional gateways 128 and 130. These additional gateways 128 and 130 operate in a manner similar to gateways 114 and 116. Each gateway 114, 116, 128, and 130 is preferably connected to only one transmux 124 or 126. The transmuxes 124 and 126 are interconnected via an internet network 132. Those skilled in the art will recognize that the transmuxes 124 and 126 may also be interconnected via an alternative network. Additional transmuxes 134 and 136 can also be connected to the network 132 and operate in a manner similar to transmuxes 124 and 126. Gateways 114 and 116 are also interconnected via a standard point-to-point TCP/IP link 122.

The originating gateway 114 digitally encodes the voice data received from the originating PSTN 106 and then divides the encoded voice data into a plurality of voice packets. In preparation for transmitting the PSTN voice packets 140 between the PSTNs 106 and 108, the gateways 114 and 116, during a network initialization phase, exchange their respective gateway 114, 128, 116, 130 and transmux 124, 126 addresses over the TCP/IP link 122. Since each gateway preferably has a dedicated transmux, standard hashing techniques may be used in an alternate embodiment to enable a transmux address to be calculated from a respective gateway address.

After initialization, the originating gateway 114 appends a destination gateway address and a destination transmux address to the PSTN voice packets 140. The originating gateway 114 then concatenates a plurality of PSTN voice packets 140 into a sorted gateway voice packet 142 which is transmitted to the originating transmux 124.

The originating transmux 124 receives groups of unsorted gateway voice packets 142 from the gateways 114 and 128. The transmux 124 then reorganizes the voice packets into several transmux voice packets 144, each bound for a different destination transmux 126, 134, or 136. The originating transmux 124 routes the transmux voice packets 144 over the internet network 132 using conventional network theory techniques.

The destination transmux 126 receives a transmux voice packet 144 and breaks the packet into a plurality of individual subpackets, and reorganizes the individual subpacket by their destination gateway address into a plurality of destination voice packets 146, each bound for a different destination gateway 116 and 130. The destination gateway 116 then receives a destination voice packet 146 and breaks the voice packet into a plurality of individual subpackets, assembles and decodes the subpackets belonging to the same voice conversation, and routes voice conversation to the destination PSTN 108. The destination PSTN 108 delivers the voice conversation to the destination phone 104.

Figure 2:
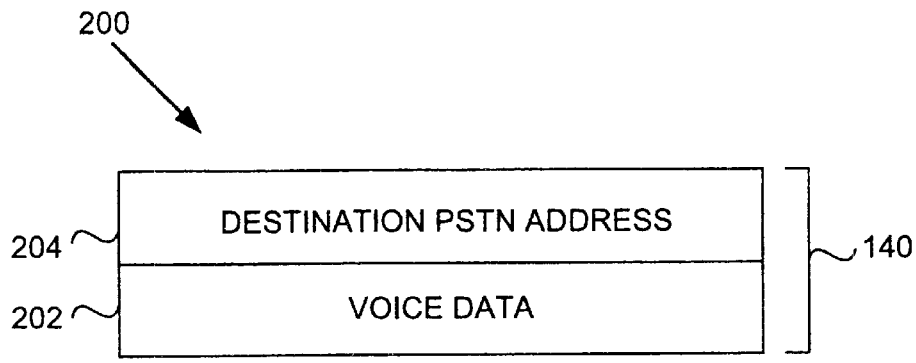
FIG. 2 is a memory map for a public switched telephone network (PSTN)-to-gateway interface and a PSTN voice packet.

FIG. 2 is a memory map 200 for the PSTN voice packet 140. The memory map 200 includes data fields containing the following information: voice data 202 and a destination PSTN address 204. The destination PSTN address 204 is derived from a phone number from the originating phone 102, which specifies the destination of a conversation.

The destination gateway 116 assembles, decodes and transmits the voice conversation data 202 to the destination PSTN 108 upon receipt of voice data packets from the destination transmux 126. Since each gateway preferably operates with only one PSTN, the destination gateway 116 routes the voice conversations directly to the destination PSTN 108.

Figure 3:
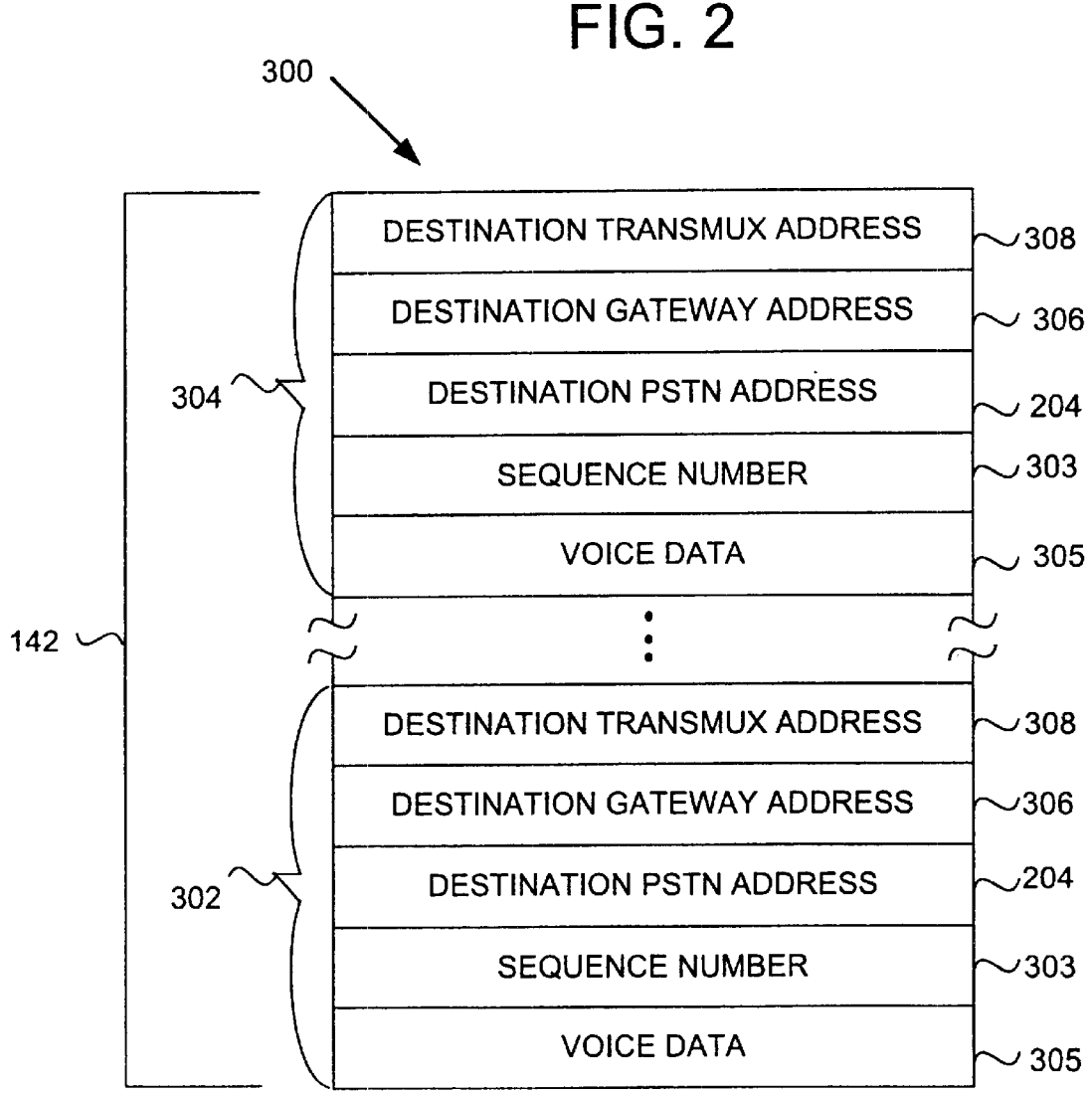
FIG. 3 is a memory map for a gateway voice packet.

FIG. 3 is a memory map 300 for a gateway voice packet 142. The memory map 300 includes data fields containing the following information: a gateway subpacket 302 and a gateway subpacket 304. The gateway subpackets 302 and 304 include voice data 305, a sequence number 303, the destination PSTN address 204, a destination gateway address 306, and a destination transmux address 308.

The originating gateway 114 digitizes and encodes the voice data 202 received from the originating PSTN 106 into packets of voice data 305. The sequence number 303 is appended to each packet of voice data 305 and is used by the destination gateway 116 to detect out-of-sequence packets. The originating gateway 114 generates a gateway voice packet 142 upon receipt of a predetermined amount of voice data 202 from the originating PSTN 106. The destination gateway address 306 and the destination transmux address 308 are derived based on both the phone number within the destination PSTN address 204 and the network configuration information transmitted over the TCP/IP link 122 from the destination gateway 116. The destination gateway address 306 and the destination transmux address 308 are appended to each PSTN voice packet 140, by the originating gateway 114. A number of gateway subpackets 302, 304 are concatenated together to form the gateway voice packet 142. The gateway voice packet 142 is then sent to the originating transmux 124. Alternatively, gateway subpackets 302, 304 may be sent to the originating transmux 124 after a predetermined period of time has elapsed, regardless of how many gateway subpackets 302, 304 have been concatenated. The gateway subpackets 302, 304 within the gateway voice packet 142 are unsorted.

Figure 4:
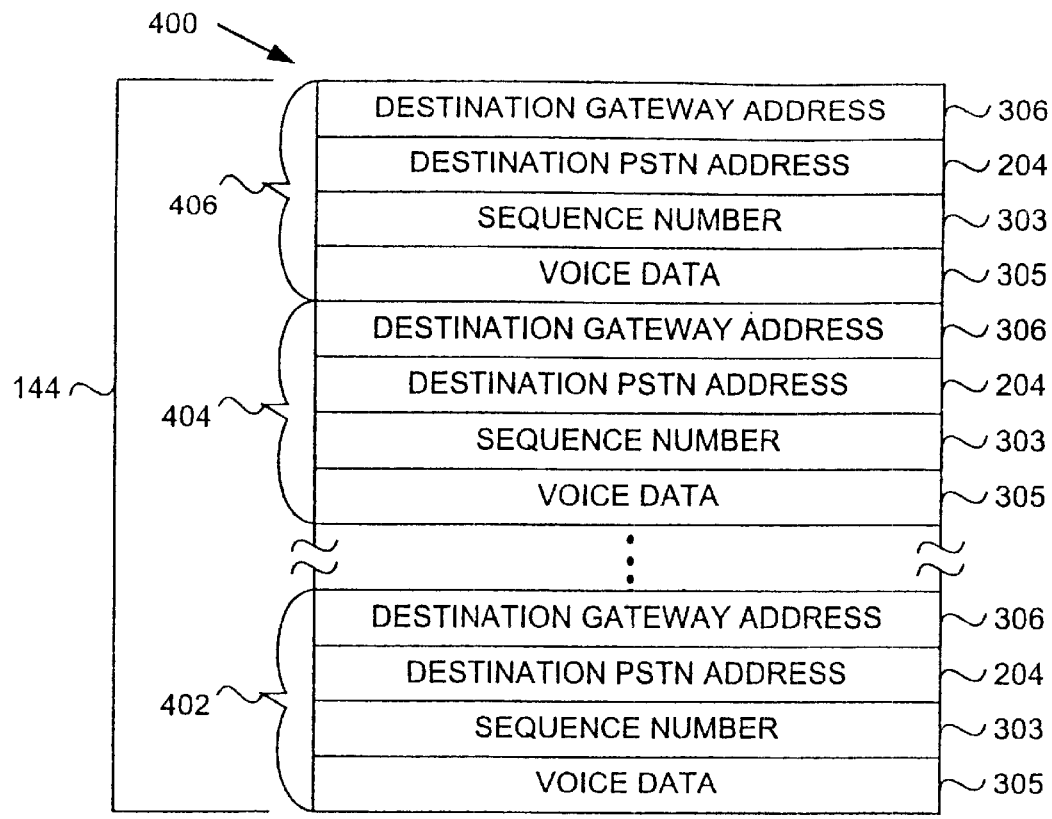
FIG. 4 is a memory map for a transmux voice packet.

FIG. 4 is a memory map 400 for a transmux voice packet 144. The memory map 400 includes data fields containing the following information: a transmux subpacket 402, a transmux subpacket 404, and a transmux subpacket 406. Each of the transmux subpackets 402, 404, and 406 include voice data 305, a sequence number 303, destination PSTN address 204, and destination gateway address 306. A predetermined (preferably on the order of about 30) number of voice data packets are linked together to form the transmux voice packet 144. Preferably, the destination transmux address 308 is stripped off of the gateway voice packet 142 before the transmux voice packet 144 is sent to the destination transmux 126. More information regarding how the transmux voice packet 144 is generated is presented with reference to FIGS. 6 and 7. Transmux voice packets 144 typically carry relatively large amounts of data on the order of 1K Byte.

Figure 5:
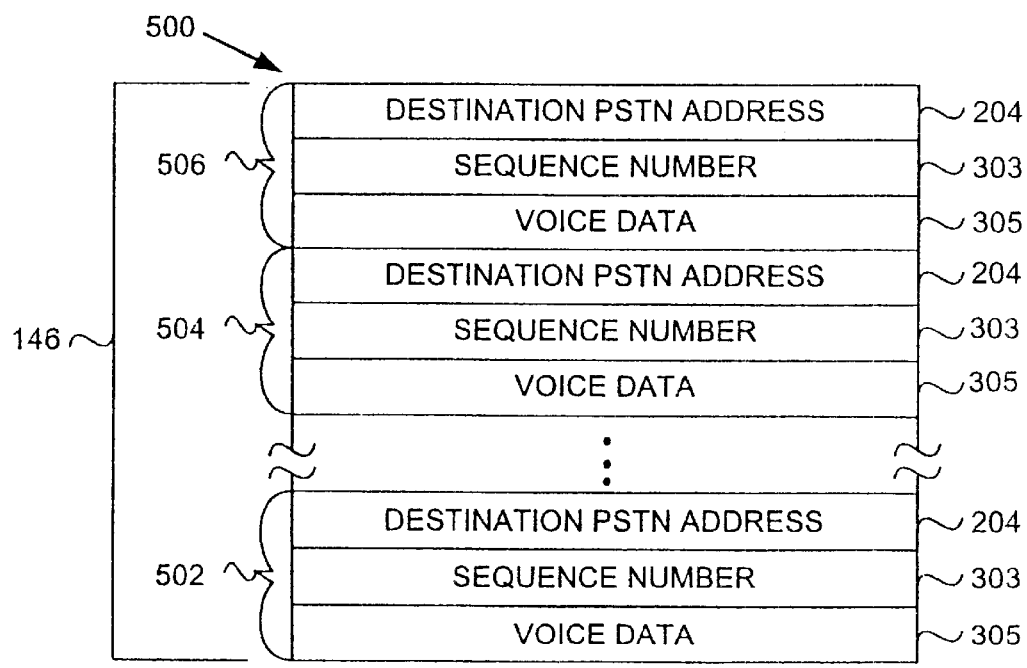
FIG. 5 is a memory map for destination packets.

FIG. 5 is a memory map 500 for a destination voice packet 146. The memory map 500 includes data fields containing the following information: a destination subpacket 502, a destination subpacket 504, and a destination subpacket 506. Each of the destination subpackets 502, 504, and 506 include voice data 305, a sequence number 303, and a destination PSTN address 204. A predetermined number of voice data packets are linked together to form the destination voice packet 146. More information regarding how the destination voice packet 146 is generated is presented with reference to FIGS. 6 and 7. Preferably, the destination gateway address 306 is stripped off before the destination voice packet 146 is sent to the destination gateway 116. Upon receipt of a destination voice packet 146 the destination gateway 116 breaks the destination voice packet 146 into destination subpackets 502, 504, 506. Each destination subpacket 502, 504, 506 is delivered to its destination PSTN for decoding to its sequence number. The destination gateway 116 then decodes and transforms the voice data 305 back into voice conversation data 202 before transmitting the voice conversation data 202 to the destination PSTN 108.

Figure 6:
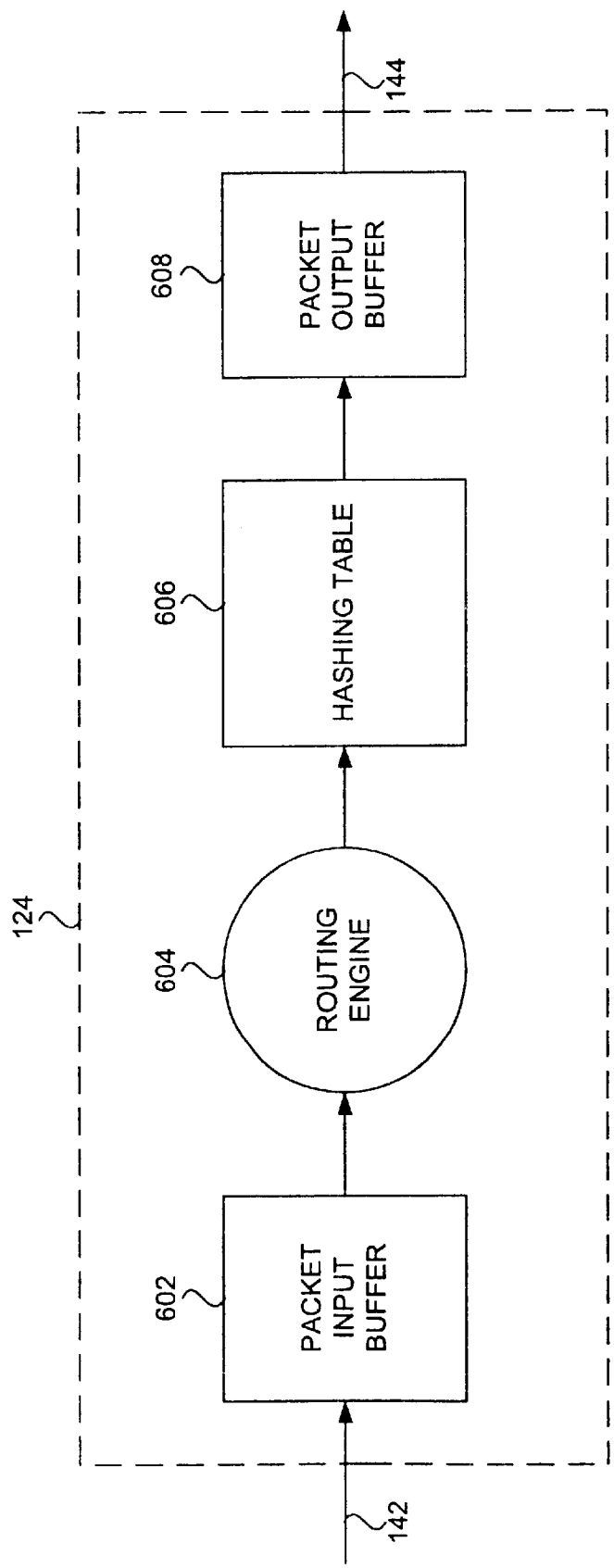
FIG. 6 is a block diagram of a transmux within the system of FIG. 1.

FIG. 6 is a block diagram of the originating transmux 124 within the system 100 of FIG. 1. The discussion which follows describes how the originating transmux 124 receives gateway voice packets 142 containing unsorted gateway subpackets 302, 304 and sorts the gateway subpackets 302, 304 into separate transmux voice packets 144. The techniques described similarly apply to the sorting performed on the transmux voice packets 144 at the destination transmux 126; this sorting of voice data packets 302, 304 in packets 144 is by destination gateway address, to produce destination voice packets 146.

The originating transmux 124 receives a gateway voice packet 142, containing a plurality of gateway subpackets 302, 304, from the originating gateway 114. The gateway subpackets 302, 304 are temporarily stored in a packet input buffer 602. A routing engine 604 creates a plurality of transmux voice packets 144 by sorting each of the gateway subpackets 302, 304 by their respective destination transmux addresses 308. The routing engine 604 then strips off the destination transmux address 308 from gateway subpacket 302 and links the remaining portion of the gateway subpacket 302 to the transmux voice packet 144. The remaining portion consists of a trimmed down transmux subpacket 402, 404, or 406 which includes only the voice data 305, the sequence number 303, the destination PSTN address 204, and the destination gateway address 306 for a particular voice conversation. This data trimming effectively compresses the gateway subpackets 302, 304, significantly reducing the total amount of data sent over the internet network 132.

A hashing table 606 holds each of the transmux voice packets 144. Each transmux voice packet 144 is bound for a different destination transmux 126. After a predetermined number of transmux subpackets 402, 404, 406 are linked together in one transmux voice packet 144 within the hashing table 606, or after a predetermined amount of time has elapsed, the transmux voice packet 144 is transferred to a packet output buffer 608. Thus, the more packets there are to be routed to the destination transmux 126, the faster the transmux voice packets 144 will fill up, and the faster the voice packets will sent on their way.

In an alternate embodiment, routing engine 604 efficiency can be increased by creating transmux voice packets 144 within the hashing table 606 before a next transmux subpacket 402, 404, 406 is even received. More specifically, the routing engine 604 would monitor an historic set of destination transmux addresses 308 and enter those same destination transmux addresses 308 into the hashing table 606. Since voice conversations typically continue for a protracted period of time, such an anticipated transmux voice packet 144 schema works well. Thus, the transmux subpackets 402, 404, 406 may be sorted, linked, and transmitted faster. If, after a predetermined time period has elapsed in which no additional transmux subpackets 402, 404, 406 references a particular destination transmux address, the routing engine 604 presumes that the corresponding voice conversation has ended and the transmux voice packet 144 corresponding to that particular destination transmux address 308 is removed from the hashing table 606.

The transmux voice packet 144 in the packet output buffer 608 is transmitted over the internet network 132 to the destination transmux 126. This sorting, hashing and transmission process is repeated for each of the other gateway subpackets 302, 304 in the gateway voice packet 142.

The routing engine 604 preferably operates on a conventionally known computer system (not shown). The computer system includes an internal memory for storing computer program instructions which control how a processing unit within the computer accesses, transforms and outputs data. The internal memory includes both a volatile and a non-volatile portion. Those skilled in the art will recognize that the internal memory could be supplemented with other computer useable storage media, including a compact disk, a magnetic drive or a dynamic random access memory.

Figure 7:
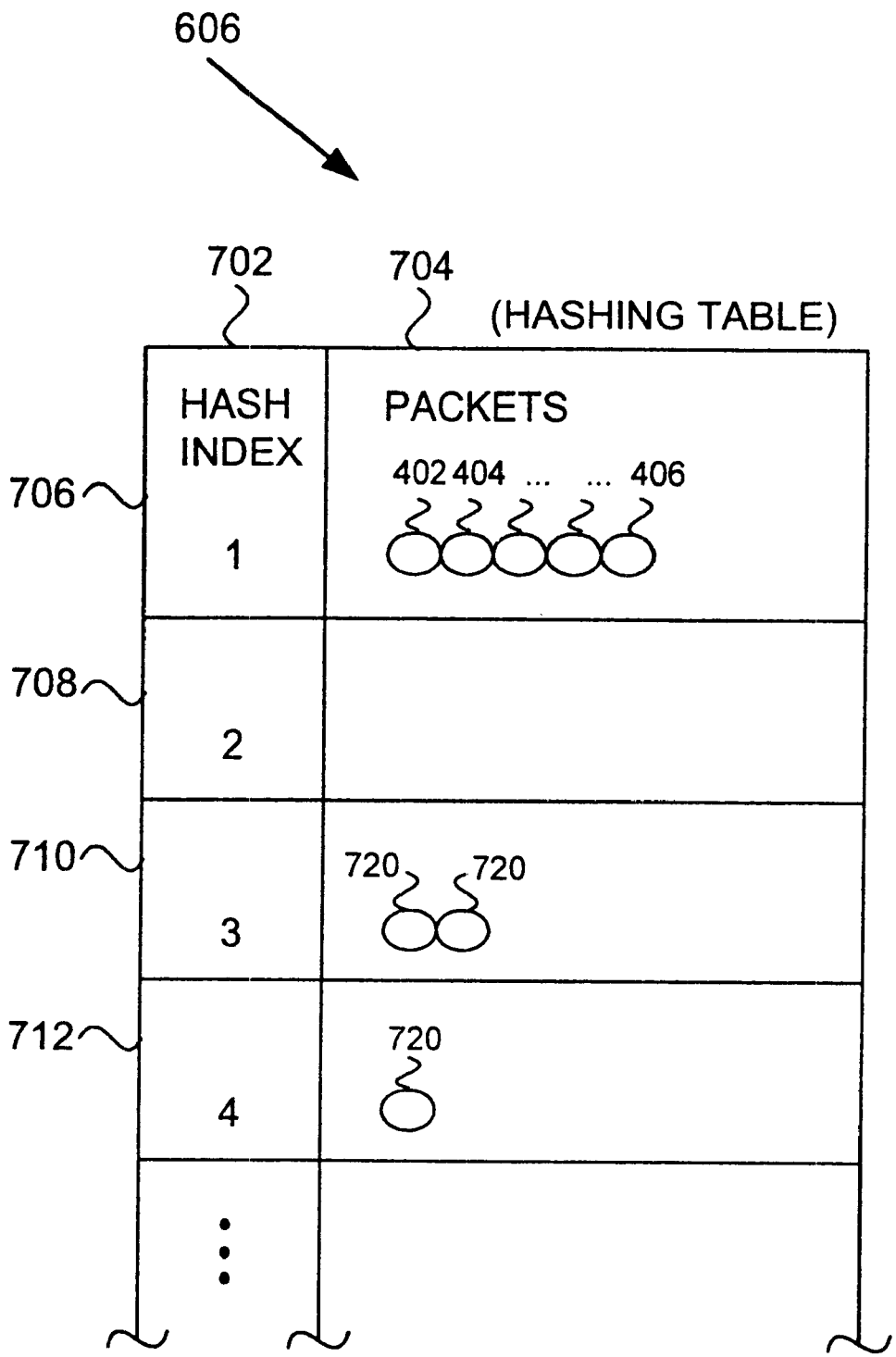
FIG. 7 is a block diagram of a hashing table within the transmux of FIG. 1.

FIG. 7 is a block diagram of the hashing table 606 within the originating transmux 124. The hashing table 606 includes a hash index 702 and an associated set of packets 704. Within the originating transmux 124, the packets 704 are transmux voice packets 144, and the hash index 702 is derived from the destination transmux address 308. Within the destination transmux 126, the packets 704 are destination voice packets 146, and the hash index 702 is derived from the destination gateway address 306. The discussion that follows refers to the hashing table 606 in the originating transmux 124, however, those skilled in the art will recognize that the same techniques apply to a hashing table 606 in the destination transmux 126.

A different transmux voice packet 144 is created within the hashing table 606 for each different destination transmux address 308 identified within the gateway subpackets 302, 304. An exemplary voice packet configuration is shown in FIG. 7. A first transmux voice packet 706 currently has five transmux subpackets 402 through 406 linked together as discussed with reference to FIG. 6. A second transmux voice packet 708 shown in FIG. 7 does not presently have any voice packets. A third transmux voice packet 710 has two transmux subpackets, generally referred to as 720, linked together. A fourth transmux voice packet 712 currently has only one transmux subpacket 720. By taking advantage of a concurrence of destination transmuxes over various high cost internet network 132 routes, the transmux voice packets 706, 708, 710 reduce overhead bandwidth and router real-time loading.

Figure 8:
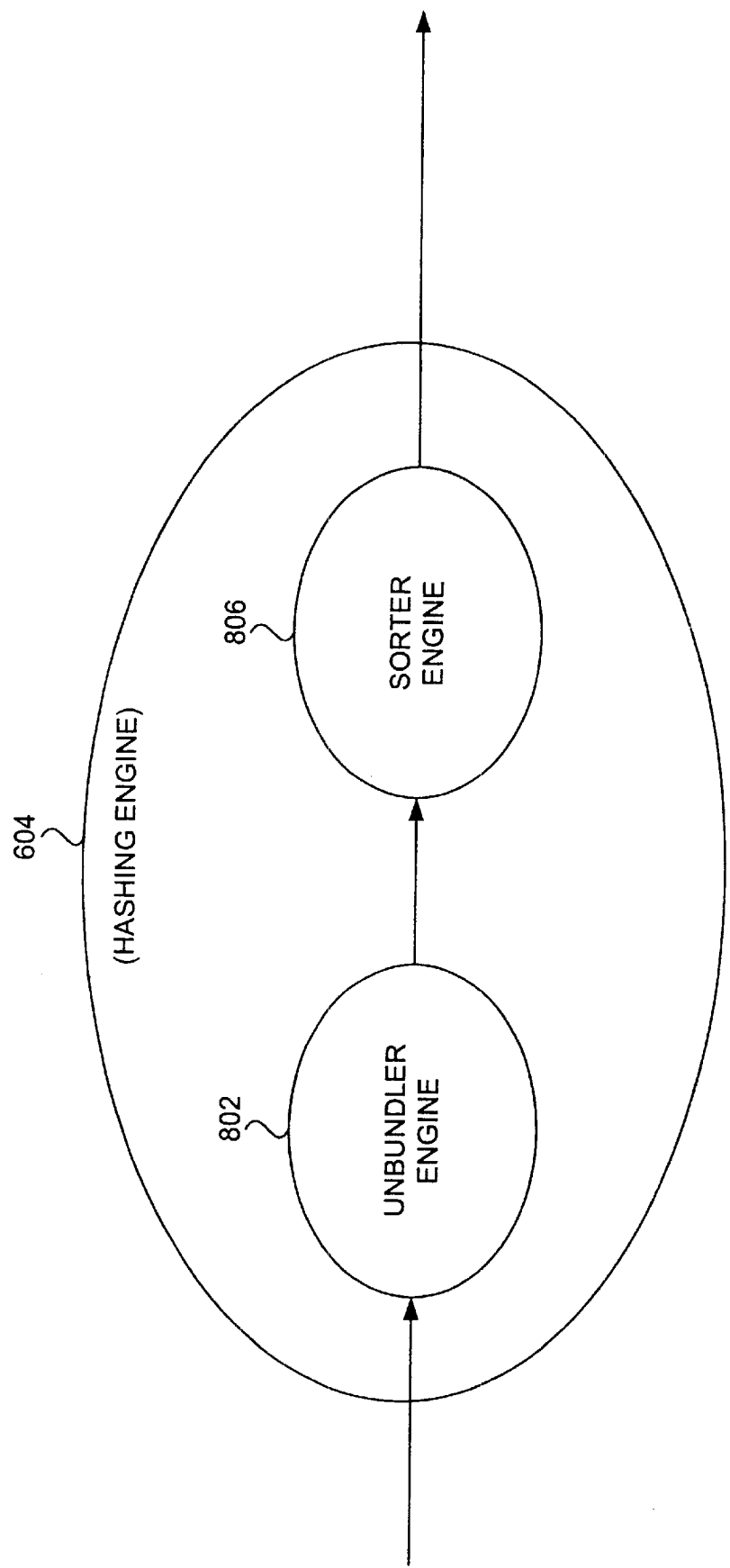
FIG. 8 is a block diagram of a routing engine within the transmux of FIG. 1.

FIG. 8 is a block diagram of the routing engine 604 within the originating transmux 124. An unbundler engine 802, within the routing engine 604, retrieves gateway voice packets 142 from the packet input buffer 602. The unbundler engine 802 separates each of the linked gateway subpackets 302, 304. A sorter engine 806 receives an individual gateway subpacket 302 and identifies the destination transmux address 308 within the gateway subpacket 302. The sorter engine 806 then uses a hashing process to condense the destination transmux address 308 into the hashing index 702. After creating the hashing index 702, the sorter engine 806 then creates and stores the transmux voice packet 144 within the hashing table 606 at a location pointed to by the just created hashing index 702. Only one instance of the destination transmux address 308 appears in the transmux voice packet 144.

The hashing process used by the sorter engine 806 is derived from an analysis of the voice packet traffic of a voice conversation. Voice conversation data tends to involve transmitting a continuous stream of small data packets. This contrasts with current internet traffic which tends to involve transmitting brief bursts of very large data packets, such as web pages or data files. While the hashing process is described with reference to destination transmux addresses 308, the process applies equally as well to destination gateway addresses 306. The goal of the hashing process is to divide memory allocated to the hashing table 606 into as few hashing indexed areas as possible. This permits the transmux voice packets 144 to be as large as possible, which enables more efficient packet transmission over the internet network 132.

The hashing method begins with an initialization routine. The object of the initialization routine is to identify all of the transmuxes 124, 126, 134, 136 and gateways 114, 116, 128, 130 on the network, and then assign a number of bits to the hashing index 702 for the transmuxes and the hashing index 702 for the gateways. For instance, if there are only eight transmuxes in a particular network configuration and the hashing table 606 is 32 kbs in size, then the hashing index 702 will be set to 3-bits ($2^3=8$) and each transmux voice packet 144 could hold a maximum of 4 kbs of voice packets. Alternatively, if there are sixteen transmuxes in a particular network configuration and the hashing table 606 is 32 kbs in size, then the hashing index 702 will be set to 4-bits ($2^4=16$) and each transmux voice packet 144 could hold a maximum of 2 kbs of voice packets.

Once the number of bits in the hashing index 702 is set, the next step is to select that same number of bits from the destination transmux address 308 which will become the hash index 702. The sorter engine 806 begins the selection process by continuously monitoring each of the different destination transmux addresses received in the gateway subpackets 302, 304. The sorter engine 806 then selects a set of "most active" bits. The most active bits are those which change between a logic 1 and logic 0 state the most often. These most active bits are the ones that tend to most uniquely identify each destination transmux address 308.

Selecting which bits in the destination transmux address 308 become the hashing index 702 can be tailored to know characteristics of destination transmux addresses 308. For instance, currently, a conventional IP address is 32-bits in length. One hashing approach would be to divide the IP address into four 8 bit groups. Next, ignore the 8 Least Significant Bits (LSBs) of the IP address since they typically refer only to local area networks at the destination gateway 116. If the hashing index 702 is 12-bits long, initially set the hashing index 702 equal to the four LSBs of each of the remaining three 8-bit groups (since the LSBs tend to be the most active). Thus three groups of four bits become a 12-bit hashing index 702 in the hashing table 606. The 12-bit hashing index 702 supports 4096 different IP addresses.

The hashing process begins with a heuristic that the destination transmux address 308 bits most active in the past will also be the most active in the future. This will necessarily be wrong sometimes since all voice conversations start and stop, and thus the sorter engine 806 cannot predict which destination transmux addresses 308 to hash into the hashing table 606. As a result, the sorter engine 806 continues to monitor the destination transmux addresses 308 for a new set of most active bits to be used to create a new hashing index 702. This can be thought of as an "adaptive hashing."

Since the hashing process preferably uses only the "most" active destination transmux address 308 bit, there is a possibility that two different destination transmux address 308 will have the same hashing index 702. Such a situation is called a "collision." For instance, in the 12-bit hashing index 702 example above, four LSBs were chosen from the three groups of 8-bits. If two different destination transmux addresses 308 differ only by one of the Most Significant Bits (MSBs) that were not used to create the hashing index, then the same hashing index will be created for both addresses 308, since there is now an ambiguity at the LSB level.

One way to avoid a possibility of a collision would be to divide the hashing table 606 into as many destination transmux addresses 308 as are possible. For a typical 32-bit IP address this would mean $2^{32}$ hashing indexes 702. Since it is doubtful that the system 100 would have that many destination transmuxes, a lot of the memory space in the hashing table 606 would always remain empty and wasted. Also, while there would not be any collisions, the transmux voice packets 144 would be so small that there would be only minimal condensing, if any. At the other extreme, a hashing index comprised of too few bits would result in a large number of collisions, reducing the present inventions efficiency. As a result, a medium number of hashing index bits are chosen which will spread active destination transmux addresses 308 over the hashing table 606. The "active" destination transmux addresses 308 are identified by which of the destination transmux addresses 308 bits are "hanging" over a measurement period. Thus, the hashing table 606 is dynamically reallocated depending upon which transmuxes out of all of the transmuxes 124, 126, 134, 136 are currently in use.

When two transmux voice packets 144 have collided, transmux subpackets 402, 404, 406 are still linked to the correct transmux voice packet 144, however the linking process just takes longer. The transmux voice packets 144 are then transmitted over the internet 132 as described above.

Figure 9:
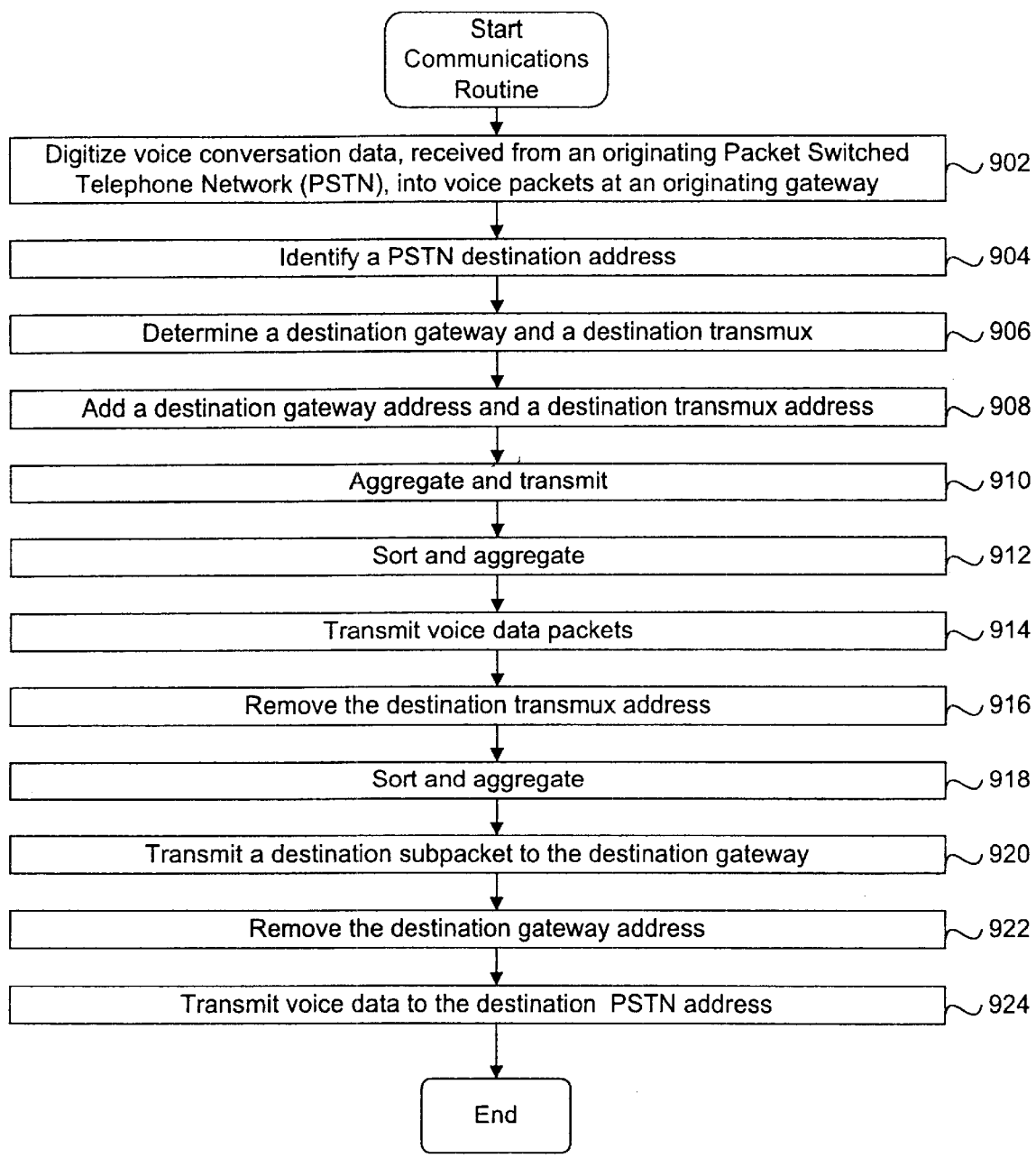
FIG. 9 is a flowchart of a method for real-time data and voice transmission over the internet.

FIG. 9 is a flowchart of a method for real-time data and voice transmission over the internet 132. The method begins in step 902 where an originating gateway 114 digitizes voice (conversation) data 202, received from an originating PSTN 106. Next, in step 904 the originating gateway 114 identifies a destination PSTN address 204 associated with each voice conversation. The originating gateway 114 then identifies a destination gateway 116 and a destination transmux 126 associated with the destination PSTN address 204, in step 906. In step 908, a corresponding destination gateway address 306 and a corresponding destination transmux address 308 is added to each PSTN voice packet 142. Next, in step 910, a predetermined number of the gateway subpackets 302, 304 from the originating gateway 114 are aggregated and transmitted as a gateway voice packet 142 to an originating transmux 124. In step 912, the gateway subpackets 302, 304 are sorted and aggregated by their destination transmux address 308. Next, in step 914, the destination transmux address 308 is removed from the gateway subpackets 302, 304 to produce transmux subpackets. A predetermined number of transmux subpackets 402, 404, 406 are transmitted from the originating transmux 124 to the destination transmux 126, in step 916. In step 918, the transmux subpackets 402, 404, 406, 720 are sorted and aggregated by their destination gateway address 306. Next, in step 920, the destination gateway address 306 is removed from each transmux subpacket 402, 404, 406, 720 to produce destination subpackets. A predetermined number of destination subpackets 502, 504, 506 are transmitted from the destination transmux 126 to the destination gateway 116, in step 922. In step 924, each destination subpacket 502, 504, 506 is transmitted to the destination PSTN address 204 associated with the voice data 202. After step 924, the process of real-time data and voice transmission is complete.

While the present invention has been described with reference to a preferred embodiment, those skilled in the art will recognize that various modifications may be made. Variations upon and modifications to the preferred embodiment are provided by the present invention, which is limited only by the following claims.

What is claimed is:

1. A method for real-time voice transmission over an internet network, comprising the steps of:
   receiving and digitizing voice data;
   appending a destination gateway address and a destination transmux address to the digitized voice data to produce gateway subpackets;
   transmitting the gateway subpackets to an originating transmux;
   sorting the transmitted gateway subpackets by their respective destination transmux addresses;
   aggregating and transmitting the sorted gateway subpackets to a destination transmux, according to the destination transmux address of each subpacket;
   receiving subpackets by the destination transmux and sorting the received subpackets by their respective gateway addresses;
   transmitting the subpackets from the destination transmux to the destination gateway; and
   converting the subpackets to voice data.

2. The method of claim 1, wherein the received and digitized voice data is received from a PSTN.

3. The method of claim 1, wherein the destination gateway address is appended at an originating gateway.

4. The method of claim 1, wherein the destination gateway address is communicated to the originating gateway via a TCP/IP link.

5. The method of claim 1, wherein prior to transmitting the gateway subpackets to an originating transmux, the method further comprises the step of aggregating the gateway subpackets to form a gateway voice packet.

6. The method of claim 5, wherein following the step of transmitting the gateway subpackets to an originating transmux, the method further comprises the step of breaking the gateway voice packets into subpackets.

7. The method of claim 6, further comprising the step of stripping the destination transmux addresses from the subpackets created from breaking the gateway voice packets.

8. The method of claim 1, wherein after the step of receiving subpackets by the destination transmux, the method further comprises the step of stripping the destination gateway address from the subpackets.

9. The method of claim 1, wherein following the step of converting the subpackets to voice data, the voice data is transmitted to a PSTN.

10. The method of claim 1, wherein the step of sorting the transmitted gateway subpackets further comprises hashing the addresses of the gateway subpackets.

11. A system for real-time voice transmission over an internet network, comprising:
    means for receiving and digitizing voice data;
    means for appending a destination gateway address and a destination transmux address to the digitized voice data to produce gateway subpackets;
    means for transmitting the gateway subpackets to an originating transmux;
    means for sorting the transmitted gateway subpackets by their respective destination transmux addresses;
    means for aggregating and transmitting the sorted gateway subpackets to a destination transmux, according to the destination transmux address of each subpacket;
    means for receiving subpackets by the destination transmux and sorting the received subpackets by their respective gateway addresses;
    means for transmitting the subpackets from the destination transmux to the destination gateway; and
    means for converting the subpackets to voice data.

12. The system of claim 11, wherein the destination gateway address is appended at an originating gateway.

13. The system of claim 11, wherein the destination gateway address is communicated to the originating gateway via a TCP/IP link.

14. The system of claim 11, further comprising means for aggregating the gateway subpackets to form a gateway voice packet.

15. The method of claim 11, wherein the means for sorting the transmitted gateway subpackets further comprises means for hashing the addresses of the gateway subpackets.

16. A computer-useable medium embodying computer program code for causing a computer to transmit real-time data and voice over an internet network, by performing the steps of:

receiving and digitizing voice data;

appending a destination gateway address and a destination transmux address to the digitized voice data to produce gateway subpackets;

transmitting the gateway subpackets to an originating transmux;

sorting the transmitted gateway subpackets by their respective destination transmux addresses;

aggregating and transmitting the sorted gateway subpackets to a destination transmux, according to the destination transmux address of each subpacket;

receiving subpackets by the destination transmux and sorting the received subpackets by their respective gateway addresses;

transmitting the subpackets from the destination transmux to the destination gateway; and converting the subpackets to voice data.

17. The computer-useable medium of claim 16, wherein prior to transmitting the gateway subpackets to an originating transmux, the computer program performs the step of aggregating the gateway subpackets to form a gateway voice packet.

18. The computer-useable medium of claim 17, wherein the computer program performs the further step of stripping the destination transmux addresses from the received subpackets.

* * * * *